March 30, 1965 J. CLIFFORD 3,175,599
REPAIR PLUG FOR TIRES
Filed Jan. 30, 1964 2 Sheets-Sheet 1
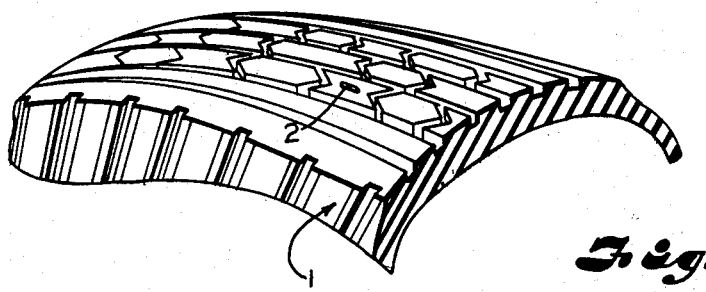
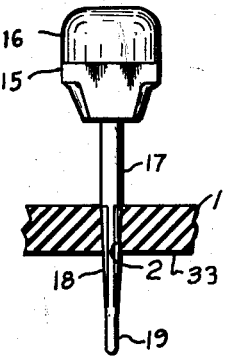
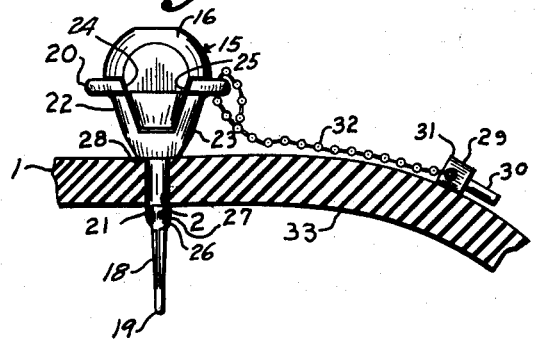
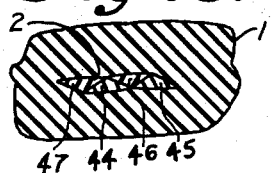
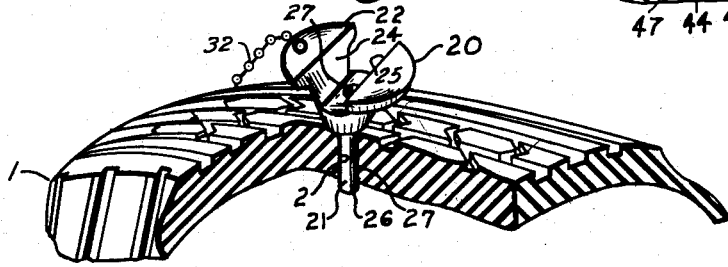
INVENTOR.
JACK CLIFFORD
BY
Fishburn and Gold
ATTORNEYS March 30, 1965 J. CLIFFORD 3,175,599
REPAIR PLUG FOR TIRES
Filed Jan. 30, 1964 2 Sheets-Sheet 2
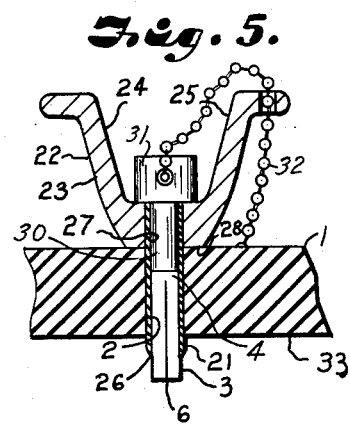
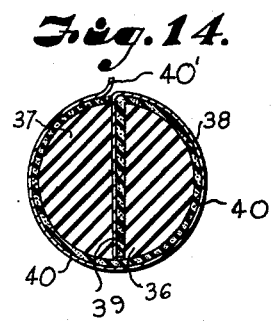
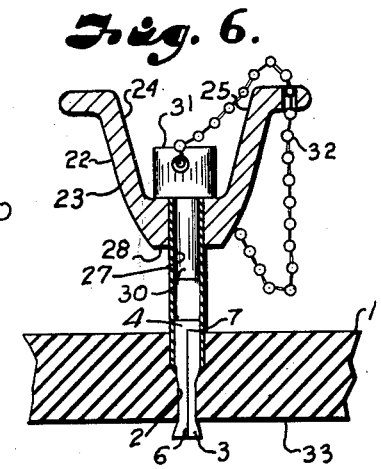
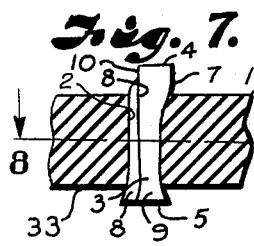
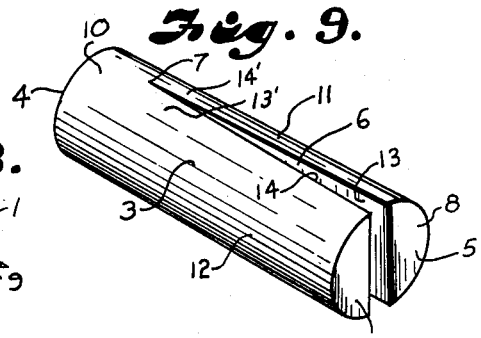
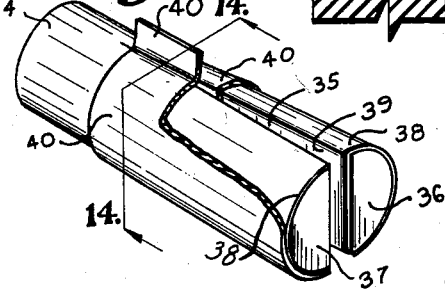
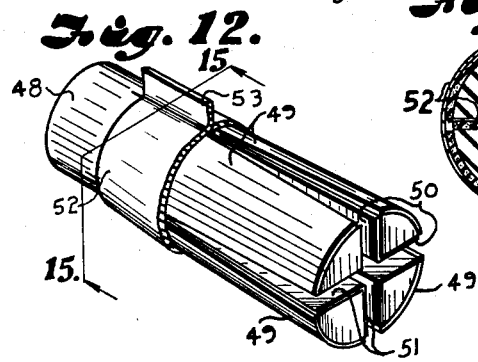
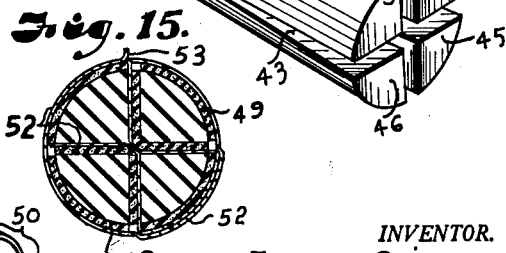
INVENTOR.
JACK CLIFFORD
BY
Fishburn and Gold
ATTORNEYS United States Patent Office 3,175,599
Patented Mar. 30, 1965

3,175,599
REPAIR PLUG FOR TIRES
Jack Clifford, 5617 Aberdeen Road, Kansas City 3, Kans.
Filed Jan. 30, 1964, Ser. No. 341,287
4 Claims. (Cl. 152—370)

This invention relates to repair devices for pneumatic tires, and more particularly to sealing plugs adapted to readily conform to the shape of puncture holes for improved sealing thereof.

Puncture holes in pneumatic tires, in the usual case, are not truly cylindrical in shape, but rather are irregular, elongated or oblong shapes of often unpredictable direction produced by the forcible tearing entry of a puncturing member. Cylindrical resilient plugs have been used in the past to repair such puncture holes and, in such case, reliance has been placed upon only the resilience and material deformability of the plugs to conform to the shape of the puncture hole in providing a seal. This invention contemplates a split repair plug having segments which are adapted to move relative to each other whereby improved plug conformation results in a seal of generally superior quality.

The principal objects of this invention are, therefore: to provide a tire puncture hole plug longitudinally split into segments which are readily and automatically movable relative to each other to more nearly conform to the usual irregular elongate or otherwise non-cylindrical puncture hole; to provide such a device which is originally substantially cylindrical in shape for ease of insertion with a hollow cylindrical tube tool; to provide such a device which produces a minimum of strain in the tire casing by easily conforming to the puncture hole shape, producing a more desirable and permanent seal; to provide such a plug with surfaces on the segments adapted to seal against engaging surfaces of other segments and the tire to effectively close and seal puncture holes and form a permanent repair; to provide such a plug of cured rubber or resilient material having a shroud of partially cured gum rubber covering the outer surface thereof and positioned between the opposed inner surfaces of the segments so as to exhibit a highly tenacious sealing medium on all contacted surfaces; to provide such a device having means retaining the segments in cylinder-forming relation for ease of use; and to provide such a plug which is relatively inexpensive and easy to use while producing a puncture hole seal of hitherto unknown effectiveness.

Other objects and advantages of this invention will become apparent from the following description taken in connection with the accompanying drawings wherein are set forth by way of illustration and example certain embodiments of this invention.

FIG. 1 is a perspective view showing the tire tread section with an elongated puncture hole therein.

FIG. 2 is a sectional view through the tire tread showing a buffer tool inserted into the tire tread puncture hole.

FIG. 3 is a sectional view through the tire tread showing the buffer tool nested within a tube tool, the combination inserted into the puncture hole.

FIG. 4 is a perspective view showing the tube tool inserted into the puncture hole in the tire tread section with the buffer tool removed.

FIG. 5 is a sectional view through the tire tread showing the tube tool in the puncture hole and containing the repair plug of this invention.

FIG. 6 is a sectional view through the tire tread showing the tube tool partially withdrawn from the puncture hole leaving the plug trapped therein.

FIG. 7 is a sectional view through the tire tread showing the plug segments displaced to conform the plug to the shape of the puncture hole.

FIG. 8 is a sectional view through the tire tread taken on the line 8—8, FIG. 7, showing the relatively displaced plug segments.

FIG. 9 is a perspective view of one embodiment of the invention showing the body thereof split into two segments.

FIG. 10 is a perspective view of an additional embodiment of the invention showing a two-segment body having the segments covered with a partially cured gum rubber shroud.

FIG. 11 is a perspective view of a further additional embodiment of the invention showing the body thereof split into four segments.

FIG. 12 is a perspective view of a further additional embodiment of the invention showing a four-segment body having the segments covered with a partially cured gum rubber shroud.

FIG. 13 is a sectional view through the tire tread showing the relatively displaced segments of a four-segment plug.

FIG. 14 is a sectional view through the two-segment plug taken on the line 14—14, FIG. 10, showing the position of the shroud covering sheet.

FIG. 15 is a sectional view through the four-segment plug taken on the line 15—15, FIG. 12, showing the position of the shroud covering sheet.

Referring more in detail to the drawings:

The reference numeral 1 indicates generally a tread section or wall of a tubeless tire containing an irregular elongated or oblong shaped puncture hole 2. A preferred embodiment of the repair plug constituting this invention is illustrated in FIG. 9 and comprises an elongated body 3 of substantially cylindrical cross-section formed of resilient rubber-like material such as cured rubber and having an upper end 4 and a lower end 5. The body 3 contains a longitudinal split 6 extending from the lower end 5 to a crotch 7 formed by the split 6 on the body 3 and which is spaced from the upper end 4. The split 6 may assume various positions and configurations on the body 3, but, in the embodiment of FIG. 9, is planar and extends substantially parallel to the axis of the body 3 and divides at least a portion of the body 3 into two elongated "half-round" or cylindrical segments 8 and 9, each having a length greater than the thickness of the tire wall or section to be repaired. An unsplit portion 10 of the body 3 extends between the upper end 4 and the crotch 7 and forms a means for retaining the segments 8 and 9 in grouped or generally cylindrical formation. However, it is apparent that other means, for example, tape or tying means such as thread, may be used to perform the same function in case the split 6 is extended the entire length of the body 3 to the upper end 4. The cylindrical segments 8 and 9 respectively exhibit outer cylindrical surfaces 11 and 12, opposed mutually engageable inner plane surfaces 13 and 14 and upper portions 13' and 14'.

In using my improved repair plug, one of several means and methods of insertion into the puncture hole may be employed. However, I prefer to use the tools and method described hereinafter.

A buffer tool 15 comprises a handle 16, a shank 17, a buffer section 18 composed of tapered flutes cut in the shank 17 which terminate in dull edges at the outer diameter of the buffer section 18, and a guiding tip 19 (FIG. 2). The buffer tool 15 is used in conjunction with a tube tool 20 which comprises a thin walled slightly tapered hollow tube 21 mounted within a base 22 having a bifurcated or Y-section 23 with upwardly and outwardly extending surfaces 24 and 25. The hollow tube 21 is tapered inwardly adjacent the tip portion 26 and provides a somewhat sharpened lower edge at the lower termination of the through bore 27; however, it is dull enough so that it will not easily cut rubber or tire cord. The base 22 exhibits a shoulder 28 which provides a stop during the insertion of the hollow tube 21 into the puncture hole 2. The hollow tube 21 extends from the shoulder 28 to beyond the inner surface of the tire after insertion into the puncture hole (FIG. 5). The buffer tool 15 is adapted to nest within the tube tool 20 as indicated in FIG. 3.

An additional device or tool useful in the practice of this invention is a gauge 29 consisting of a cylindrical shank 30 mounted upon a larger diameter cylindrical head 31. The shank 30 fits within the hollow tube 21 for a purpose explained hereinafter. For convenience, a chain or the like 32 is provided to secure the gauge to the tube tool 20. Additional details regarding the above-described tools may be found in my Patent No. 3,029,671 issued April 17, 1962.

Prior to inserting the body 3 into the puncture hole, the buffer tool 15 is dipped into rubber cement so that the buffer section 18 is covered therewith. The rubber cement, in this instance, acts as a lubricant to prevent tearing and promote ease of insertion. The tip 19 acts as a guiding means for the buffer tool 15. The rotation of the buffer section 18 roughens up the walls of the puncture hole to properly condition them for bonding and the cement held on the buffer section 18 is deposited within the hole and intimately applied against the wall surfaces thereof. The buffer tool 15 is then withdrawn from the tire and nested within the tube tool 20. After redipping the tip 19 and buffer section 18 into rubber cement, the combination of buffer tool and tube tool is inserted into the puncture hole up to the shoulder 28 of the tube tool, slightly stretching the puncture hole (FIG. 3). The buffer tool 15 no longer being in contact with the tire is then withdrawn, leaving the hollow tube 21 communicating between the inside and the outside of the tire (FIG. 4).

The body 3 is first dipped into rubber cement and then inserted into the hollow tube 21 which is slightly smaller in inside diameter than the outside diameter of the plug in order that the plug will be retained but movable in the tube. The shank 30 of the gauge 29 is then inserted into the hollow tube 21 to urge the plug downwardly into the tube so that the lower end 5 of the body extends beyond the tip portion 26 of the hollow tube 21.

In order to repair the puncture hole, the tube tool 20 is merely withdrawn from the tire. As the withdrawing tip portion 26 passes the inner surface 33 of the tire, the puncture hole 2, no longer being retained by the tube 21 in stretched condition, contracts adjacent the lower end 5 and grasps the body 3, engulfing and compressing same and preventing its withdrawal with the tube. As the puncture hole contracts about the body 3, greater pressure is applied on the cylindrical segments 8 and 9 in particular directions due to the irregular, oblong or elongated shape of the puncture hole. This pressure, in the presence of the rubber cement acting as a lubricant, causes the cylindrical segments 8 and 9 to move relative to each other and form a configuration which more closely conforms to the true shape of the puncture hole (FIGS. 7 and 8).

After the insertion of the body 3 into the puncture hole, the body portion 10 adjacent the upper end 4 extends above the tire so as not to significantly restrict the lateral movement of the segments. If desired, the body portion 10 may be severed at the tread surface since it is then no longer necessary to retain the cylindrical segments in a group and the removal of the body portion 10 permits at least the upper portions 13' and 14' of the segments to be displaced more easily to conform to the shape of the puncture hole.

It has been found that the use of my improved sealing plug results in high quality puncture repairs with a minimum of stress in the area of the puncture hole. This is highly desirable since such stress defines a weak spot in the tire which promotes tearing and opening of the puncture hole during severe service. The split plug of this invention is particularly desirable for use with tubeless tires wherein the tire casing must provide a leak-free medium for retaining pneumatic pressure within the tire.

An additional embodiment of this invention is illustrated by FIG. 10 wherein the plug body 34 contains a longitudinal split 35 dividing the body 34 into cylindrical segments 36 and 37. A partially cured gum rubber layer or shroud 38 covers the outer cylindrical surfaces of the segments 36 and 37 and also extends between the opposed inner surfaces thereof at 39. The gum rubber shroud 38 when soaked in rubber cement for a minute or two absorbs some of the solvent therein and becomes soft and tacky, permitting ease of relative segment movement and providing an excellent medium for bonding or vulcanizing engaged tire surfaces and plug surfaces which are placed into mutual contact by the plug insertion into the puncture hole. Further details regarding the soaking time in the cement and the handling of the shrouded plug may be found in my Patent No. 3,029,671 issued April 17, 1962. A thin flexible plastic sheet 40 provides a protective covering over all exposed surfaces of the gum rubber shroud 38 including the area at 39 between the inner surfaces of the segments 36 and 37. The purpose of the sheet 40 is to protect the shroud from contamination with fingerprints and foreign matter such as dust which have an adverse effect upon the bonding properties thereof. The sheet 40 also prevents the segments 36 and 37 from sticking together due to the natural tackiness of the shroud 38. With the aid of a peeling tab 40', the sheet 40 is removed from the segments 36 and 37 immediately prior to the soaking thereof and insertion into the puncture hole.

An additional embodiment of this invention is illustrated by FIG. 11 wherein a cylindrical body 41 contains two lengthwise splits 42 and 43 substantially perpendicular to each other and dividing the body into four quarter-round or elongated cylindrical segments 44, 45, 46 and 47. The four-segment plug of FIG. 11 is used in the same manner described above with reference to the plug of FIG. 9. In certain applications, it has been found that the four-segment plug appears to deform more readily to assume the shape of the puncture hole (FIG. 13).

A further additional embodiment of this invention is illustrated by FIG. 12 wherein a four-segment body 48 has the outer cylindrical surfaces thereof covered with a partially cured gum rubber layer or shroud 49 which also extends between the opposed inner surfaces of the segments at 50 and 51. A plastic sheet 52 having a peeling tab 53 acts as a protective covering for the shroud 49 prior to the use of the plug. The embodiment of FIG. 12 is used in the same manner described above with reference to the embodiment of FIG. 10.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A sealing plug for closing puncture holes in pneumatic tires comprising, an elongate body of resilient rubber-like material having an upper end and a lower end, said body being generally cylindrical in cross-section with outer surfaces and having a longitudinal split therein extending from said lower end and for a length greater than the tire wall thickness, said split forming relatively displaceable cylindrical segments with mutually opposed inner surfaces therebetween, a spread of adhesive cement applied to said outer and inner surfaces, said split lower end being adapted to advance into a puncture hole of a tire as the walls surrounding the hole are stretched by internal force with said walls exerting a contractive force on said body segments laterally in all directions as said internal force is withdrawn to move said segments laterally to conform to the shape of the puncture hole and induce through adhesive spread a mutual bonding of each with the other and with the walls surrounding the hole to establish a seal therefor.

2. A sealing plug for closing puncture holes in pneumatic tires comprising, an elongate body of resilient rubber-like material having an upper end and a lower end, said body being generally cylindrical in cross-section with outer surfaces and having a longitudinal split therein extending from said lower end and for a length greater than the tire wall thickness, said split forming relatively displaceable cylindrical segments with mutually opposed inner surfaces therebetween, means adjacent said upper end of said body for retaining said segments together in a generally cylindrical formation for insertion into a puncture hole, said retaining means being spaced from said lower end of the body a distance greater than the tire wall thickness, a spread of adhesive cement applied to said inner and outer surfaces, said split lower end being adapted to advance into the puncture hole as the walls surrounding the hole are stretched by a tubular insert with said walls exerting a contractive force on said segments laterally in all directions as said tubular insert is withdrawn to displace said segments laterally to conform to the shape of the puncture hole and induce through adhesive spread a mutual bonding of each with the other and with the walls surrounding the hole to establish a seal therefor.

3. A sealing plug for closing puncture holes in pneumatic tires comprising, an elongate body of resilient rubber-like material having an upper end and a lower end, said body being generally cylindrical in cross-section and having a longitudinal split therein extending from said lower end and for a length greater than the tire wall thickness, said split forming laterally movable cylindrical segments, said segments having outer cylindrical surfaces and opposed surfaces therebetween, means adjacent said upper end of said body for retaining said segments together in a generally cylindrical formation for insertion into a puncture hole, said retaining means being spaced from said lower end of the body a distance greater than the wall thickness of the tire to be repaired, a partially cured gum rubber shroud covering said outer surfaces of the segments and positioned between said opposed surfaces, a removable protective sheet covering the exposed surfaces of said shroud which when removed exposes surfaces to a spread of adhesive cement, said split lower end being adapted for insertion into a puncture hole with said retaining means extending beyond the tire as the hole is expanded and contraction of said walls displacing said segments laterally to conform to the shape of the puncture hole and induce through adhesive spread a mutual bonding of each with the other and with the walls surrounding the hole to establish a seal therefor.

4. A sealing plug for closing puncture holes in pneumatic tires comprising, an elongate body of resilient rubber-like material having an upper end and a lower end, said body being generally cylindrical in cross-section and having a pair of intersecting longitudinal splits therein extending from said lower end and for a length greater than the tire wall thickness forming four laterally movable cylindrical segments, said segments having outer cylindrical surfaces and opposed mutually engageable surfaces therebetween, means adjacent said upper end of said body for retaining said segments together in a generally cylindrical formation for insertion into a puncture hole, said retaining means being spaced from said lower end of the body a distance greater than the wall thickness of the tire to be repaired, a partially cured gum rubber shroud covering said outer surfaces of the segments and positioned between said opposed surfaces, a removable protective sheet covering the exposed surfaces of said shroud which when removed exposes surfaces to a spread of adhesive cement, said split lower end being adapted for insertion into a puncture hole with said retaining means extending beyond the tire as the hole is expanded and removal of said retaining means permits the segments to be more easily displaced laterally to conform to the shape of the puncture hole in response to contraction of the walls surrounding said hole and induce through adhesive spread a mutual bonding of the segments each with the other and the wall surrounding the hole to establish a seal therefor.

References Cited by the Examiner

UNITED STATES PATENTS 3,029,671   4/62   Clifford _____ 81—15.7
3,095,342   6/63   Kraly _____ 152—37 X ARTHUR L. LA POINT, *Primary Examiner.*